United States Patent [19]

Wehner

[11] 3,721,315
[45] March 20, 1973

[54] STEP AND STOOL AND CASTER MOUNTING THEREFOR

[75] Inventor: Norvin J. Wehner, Kansas City, Mo.

[73] Assignee: Cramer Industries, Inc., Kansas City, Kans.

[22] Filed: June 30, 1971

[21] Appl. No.: 158,394

[52] U.S. Cl. ..................182/15, 16/38, 16/44, 18/33
[51] Int. Cl. ..........................A47c 3/18, A47c 9/00
[58] Field of Search.......182/15, 33; 24/213 CS, 216; 16/30, 38, 37, 44; 151/41.73; 85/36

[56] References Cited

UNITED STATES PATENTS

| | | | |
|---|---|---|---|
| 3,559,761 | 2/1971 | Wehner | 182/15 |
| 1,489,206 | 4/1924 | Greene | 16/38 |
| 2,656,577 | 10/1953 | Carbary | 24/216 |
| 3,297,072 | 1/1967 | Galer | 151/41.73 |
| 3,599,750 | 12/1968 | Serwer | 182/15 |

Primary Examiner—Reinaldo P. Machado
Attorney—Claude A. Fishburn et al.

[57] ABSTRACT

A step and stool and caster mounting therefor includes a base having portions engageable with legs of a stool portion for supporting and removably securing same thereon and members for movably receiving one end of each of a plurality of respective caster pintles therein and clips engageable with the caster pintles and the pintle receiving members for retaining the casters mounted on the base.

12 Claims, 8 Drawing Figures

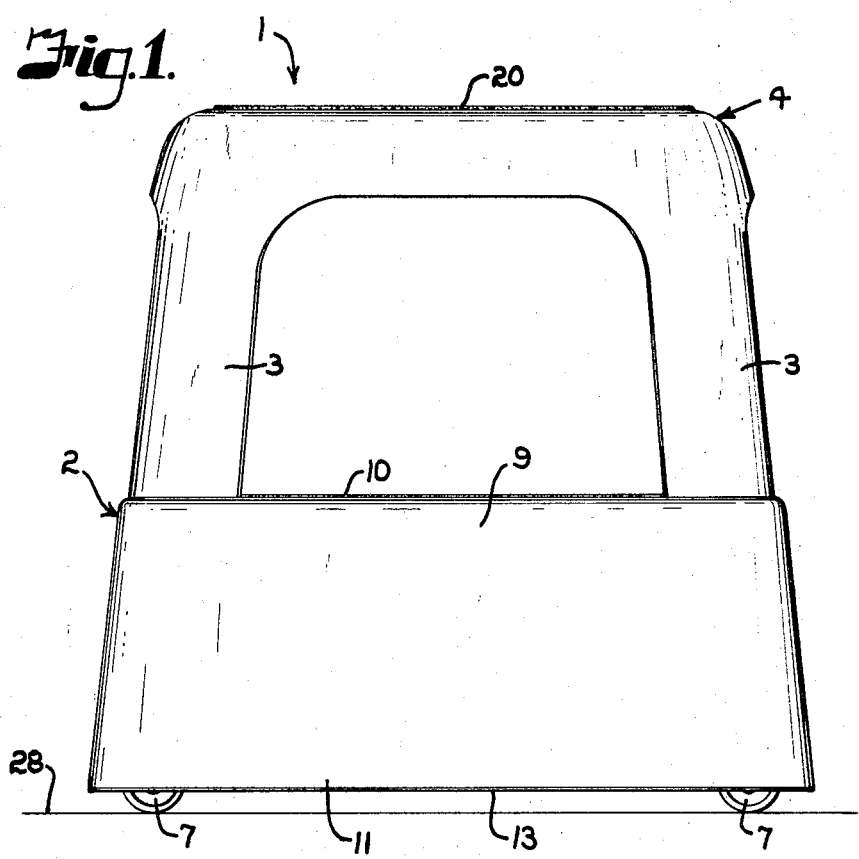
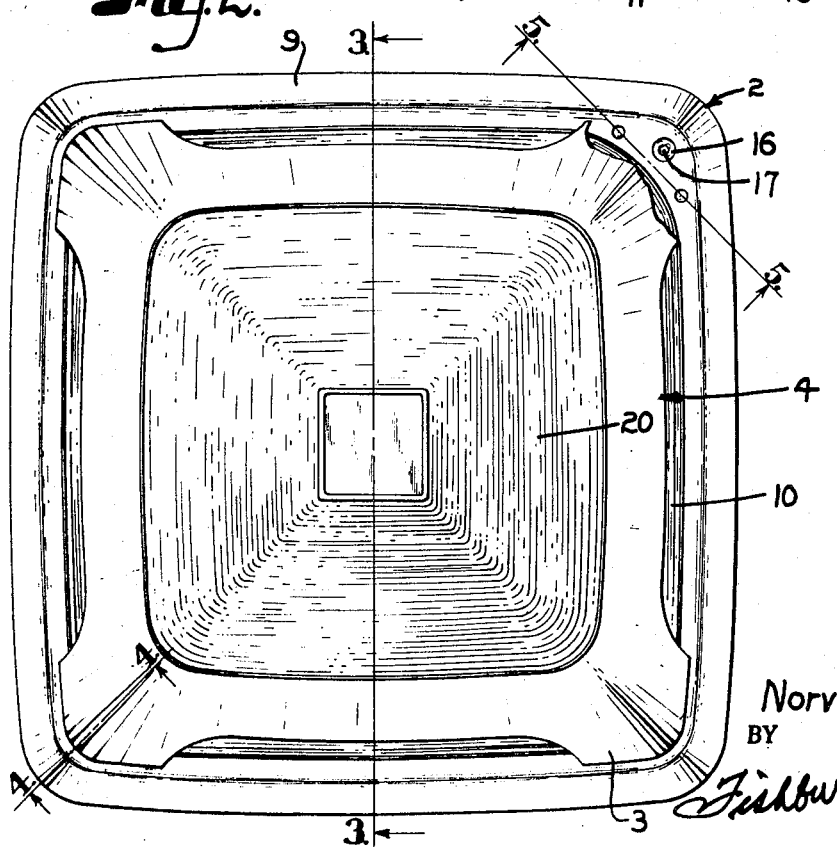
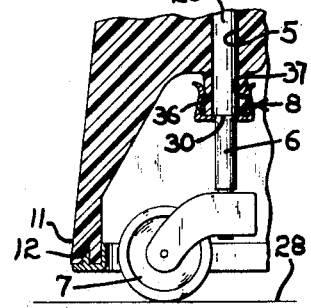
INVENTOR.
Norvin J. Wehner
BY
Fishburn Gold & Litman
ATTORNEYS

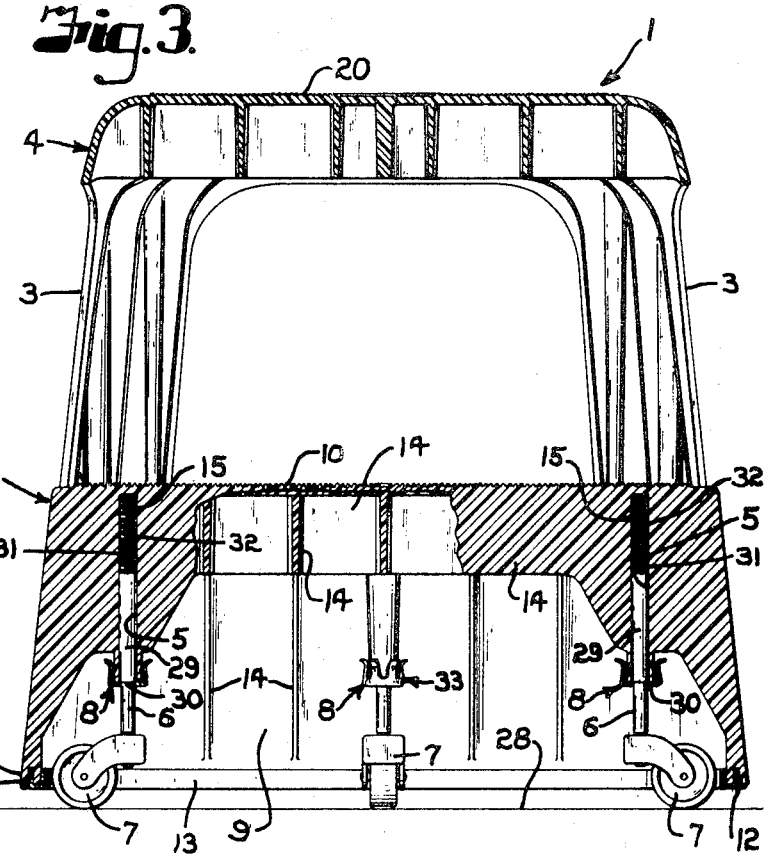
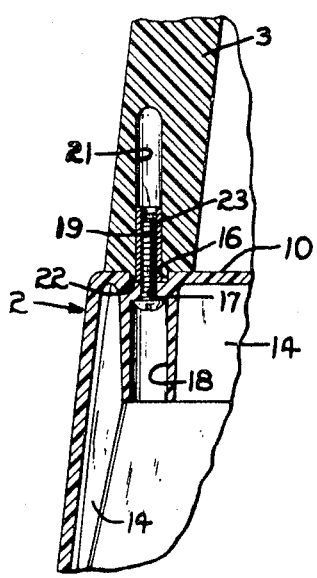
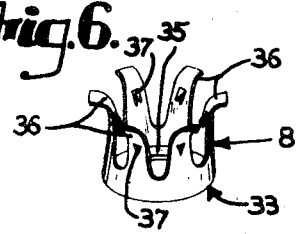
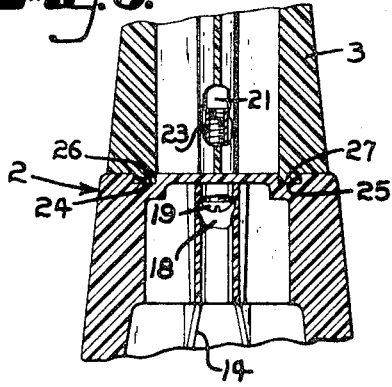
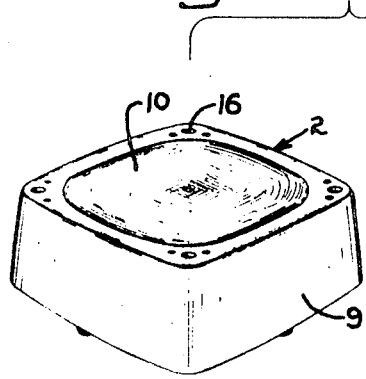
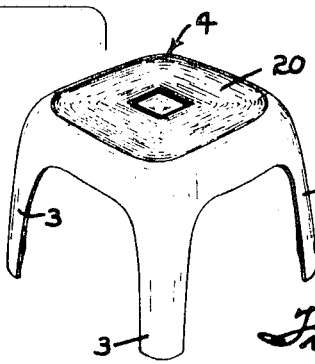

STEP AND STOOL AND CASTER MOUNTING THEREFOR

The present invention relates to combined step and stool structures and more particularly to a combined step and stool structure having collapsible casters and means for mounting same on the step and stool to prevent removal therefrom.

The principal objects of the present invention are: to provide a combined step and stool structure and means for removably and firmly securing legs of a stool portion to a base wherein each leg has three point support on the base; to provide such a step and stool structure having a novel caster mounting permitting free movement of a pintle of the caster between a step and stool supporting position and a collapsed position under load and prevent removal of the casters from the base; to provide such a combined step and stool structure wherein the caster mounting includes a clip engageable with a respective caster pintle and hollow bosses receiving the caster pintle therein to retain the caster in position and permit movement of the pintle thereof in the respective bosses; and to provide such a combined step and stool structure and caster mounting therefor which is sturdy in construction, economical to manufacture, attractive in appearance, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment illustrating various objects and features of the step and stool and caster mounting therefor of the present invention.

FIG. 1 is a side elevational view of a step and stool structure embodying features of the present invention.

FIG. 2 is a top plan view with portions broken away to better illustrate the component parts.

FIG. 3 is a transverse sectional view taken on line 3—3, FIG. 2, and showing members for mounting casters on the combined step and stool structure.

FIG. 4 is an enlarged fragmentary sectional view taken on line 4—4, FIG. 2, and showing a removable connection between a base and legs of a stool portion of the combined step and stool structure.

FIG. 5 is an enlarged fragmentary sectional view taken on line 5—5, FIG. 2, and showing seating of projections extending from the legs of the stool portion being received in recessed portions on top of the base.

FIG. 6 is an enlarged perspective view of a clip for retaining caster pintles in their respective mounting on the base.

FIG. 7 is an enlarged fragmentary sectional view showing mounting of a caster on the combined step and stool structure.

FIG. 8 is a perspective view of a base and stool portion separated for use invidually as step stools.

Referring more in detail to the drawings:

As required, detailed embodiments of the present invention are disclosed herein, however, it is to be understood that the disclosed embodiments are merely exemplary of the invention which may be disclosed in various forms that are different from those illustrative embodiments presented herein. Therefore, specific structural and functional details disclosed herein are not to be interpreted as limiting but merely as a basis for the claims actually defining the scope of this invention. In this regard, it is to be recognized that combined step and stool structures, in accordance herewith, may be embodied in various forms, and, furthermore, that such combined step and stool structures may have various members or ribs for strengthening and supporting respective top deck areas of a base and stool portion. However, the disclosure hereof is presented only as a representative basis for teaching one skilled in the art to variously employ the present invention in virtually any appropriate detailed structure.

In the disclosed embodiment of the present invention, the reference numeral 1 generally designates a combined step and stool structure including a base 2 having portions thereof engageable with legs 3 of a stool portion 4 for removably securing same thereon and members 5, as later described, for movably receiving one end of respective pintles 6 of each of a plurality of casters 7 therein and clips 8 engageable with the pintle 6 of the casters 7 and the pintle receiving members 5 for retaining the casters 7 mounted on the base 2 while permitting movement or collapsing thereof under load.

In the illustrated structure, the base 2 is a hollow member with side walls 9 depending from a flat top 10 and having a lower peripheral rim portion 11 with a recess 12 therein to receive a floor engaging bumper 13. The flat top 10 of the base 2 provides a deck area which is suitably strengthened, as by a plurality of intersecting ribs 14 to thereby support loads thereon, such as individuals standing or sitting on the flat top 10 of the base 2.

The pintle receiving members 5 are illustrated as a plurality of equally spaced hollow bosses depending from the flat top 10 of the hollow base 2 and spaced from the side walls 9 and each having a closed upper end 15. In the illustrated structure, the hollow bosses 5 are spaced from each of the side walls 9 and positioned intermediate the ends thereof. It is desirable to provide substantially rigid support for the hollow bosses 5, therefore, each of the hollow bosses 5 is positioned in one of the respective ribs 14 and in an enlarged depending portion thereof.

A plurality of spaced recessed portions are arranged in groups which are positioned on the flat top 10 of the hollow base 2 for supporting each of the legs 3 of the stool 4, as later described. In the illustrated structure, one recessed portion 16 of each group has a generally vertically extending bore 17 therethrough and a hollow guide or boss 18 depends from the flat top 10 of the base 2 for each of the bores 17 through respective recessed portions 16 on the flat top 10 of the base 2 and communicates therewith for receiving a suitable fastening member, such as a screw 19, for removably securing respective legs 3 of the stool portion 4 on the base 2, as later described.

In the illustrated structure, the stool portion 4 has a generally flat top 20 of less area than the flat top 10 of the base 2 and the legs 3 are equally spaced and depend from the flat top 20. Each of the legs 3 of the stool portion 4 has a plurality of spaced projections extending outwardly from a lower end thereof to be received within respective recessed portions on the flat top 10 of the base 2. A generally vertical bore 21 extends through one projection 22 of the plurality of projections depending from each of the legs 3. The bores 17 and 21 communicate for receiving the screw 19 and in the illustrated structure, a suitable threaded sleeve 23 is mounted in the bore 21 through the projection 22 depending from each of the legs 3 to receive the screw 19, as best illustrated in FIG. 4.

FIG. 5 illustrates other recessed portions 24 and 25 adjacent each recessed portion 16 of each group on the flat top 10 of the base 2 for receiving respective other projections 26 and 27 depending from each of the legs 3 of the stool portion 4 whereby each leg 3 of the stool portion 4 has a three point support on the flat top 9 of the base 2.

Each of the hollow bosses 5 is adapted to have the pintle 6 of a respective caster 7 mounted therein for rollably supporting the base 2 and stool portion 4 under no-load conditions and collapsible under application of load or pressure to the base 2 or stool portion 4 to allow the bumper 13 to engage a floor surface 28.

The pintle 6 of each of the casters 7 has an enlarged end portion 29 received in the respective hollow bosses 5 and defining a downwardly facing shoulder 30. Each pintle 6 has the enlarged end portion 29 thereof rotatably mounted in the respective hollow bosses 5 and each pintle 6 has an upper end 31 thereof spaced from the closed upper end 15 of the respective bosses 5.

Suitable resilient means, such as a spring 32, is mounted in each of the hollow bosses 5 and has respective opposite ends thereof engaging the closed upper end 15 of the respective hollow boss 5 and the upper end 31 of the pintle 6 therein for normally urging the pintle 6 and caster 7 downwardly to thereby support the step and stool structure 1 for rolling movement over the floor surface 28 under no-load conditions.

Pintle retaining means 33 are mounted on each of the hollow bosses 5 and engageable with the pintle 6 of the respective casters 7 for permitting collapsing thereof and for retaining each pintle 6 in the respective hollow bosses 5. In the illustrated structure, a clip 8 for each caster 7 has portions thereof engageable with an exterior surface of each of the respective hollow bosses 5 and with the downwardly facing shoulder 30 of the pintle 6 of the respective casters 7 to thereby retain the enlarged end portion 29 thereof within the respective hollow boss 5.

The clip 8 has a generally planar base portion 35 having an aperture therethrough for a shaft portion of the respective pintle 6 to move during collapsing of the caster 7 under load. The aperture through the base portion 35 is sized to permit movement of the shaft portion of the pintle 6 below the downwardly facing shoulder 30 and the base portion 35 of the clip 8 is engageable with the downwardly facing shoulder 30 of the respective pintle 6 to retain same within the respective hollow boss 5.

The clip 8 also has a plurality of spaced arm portions 36 extending from the base portion 35 and each of the arm portions 36 has a downwardly extending projection 37 which is engageable with an exterior surface of the respective hollow bosses 5 to thereby resist removal of the clip 8 from the respective bosses 5.

It is desirable to effect firm engagement of the projections 37 with the exterior surface of the respective hollow bosses 5, therefore, each of the clips 8 is formed of a spring metal whereby each of the arm portions 36 of each clip 8 is biased toward the exterior surface of the respective boss to thereby urge the projections 37 into engagement therewith. The stop and stool structure and particularly the base 2 is preferably formed of a suitable plastic whereby the projections 37 are adapted to indent the surface and substantially resist removal of the clip 8 from the respective boss 5.

In using a step and stool structure, constructed as illustrated and described, the structure 1 is moved to the location desired and load is applied to the base 2 or the stool portion 4, as by standing on the base 2 or stool portion 4 or sitting on the stool portion 4 and when load is applied to the step and stool structure 1, the pintles 6 move upwardly in the respective hollow bosses 5 collapsing the spring 32 to permit the floor engaging bumper 13 to move downwardly and engage the floor surface 28 thereby firmly supporting the step and stool structure 1 during the application of load thereon. When it is desired to use the base 2 or the stool portion 4 separately, the screws 19 are removed and the stool portion 4 is supported on the floor surface 28 on the plurality of projections 22 and 26 and 27 on the lower ends of the legs 3 thereof.

It is to be understood that while I have illustrated and described one form of my invention, it is not to be limited to the specific form or arrangement of parts herein described and shown.

What I claim and desire to secure by Letters Patent is:

1. A step and stool comprising:
   a. a hollow base having a generally flat top and a lower peripheral rim;
   b. a floor engaging bumper secured to said lower peripheral rim;
   c. a stool portion having a generally flat top of less area than the top of said base and provided with a plurality of equally spaced supporting legs;
   d. a plurality of equally spaced hollow bosses depending from the top of said base;
   e. a collapsible caster for each of said hollow bosses for rollably supporting the base and stool portion under no-load conditions and collapsible under application of pressure to the base or stool portion to allow said bumper to engage a floor surface, said casters each having a pintle received in said respective bosses, the pintle of each of said casters having an enlarged end portion received in said respective bosses and defining a downwardly facing shoulder;
   f. means mounted on each of said bosses and engageable with the pintle of said respective casters for permitting collapsing thereof and for retaining the pintle in said respective bosses, said pintle receiving means comprising a clip having portions engageable with an exterior surface of said respective bosses and with the downwardly facing shoulder of the caster pintle to thereby retain the enlarged end portion thereof within said respective bosses, the portions of said clip engageable with the exterior surface of said respective bosses including a plurality of spaced downwardly extending projections urged into engagement with said exterior surface; and g. cooperating means on said legs of said stool portion and carried by the top of said base to removably secure said stool portion to said base whereby said stool portion and base may be separated and used separately as step stools.

2. A step and stool comprising:
a. a hollow base having a generally flat top and a lower peripheral rim;
b. a floor engaging bumper secured to said lower peripheral rim;
c. a stool portion having a generally flat top of less area than the top of said base and provided with a plurality of equally spaced supporting legs;
d. a plurality of equally spaced hollow bosses depending from the top of said base;
e. a collapsible caster for each of said hollow bosses for rollably supporting the base and stool portion under no-load conditions and collapsible under application of pressure to the base or stool portion to allow said bumper to engage a floor surface, said casters each having a pintle received in said respective bosses;
f. means mounted on each of said bosses and engageable with the pintle of said respective casters for permitting collapsing thereof and for retaining the pintle in said respective bosses,
g. cooperating means on said legs of said stool portion and carried by the top of said base to removably secure said stool portion to said base whereby said stool portion and base may be separated and used separately as step stools, said means for removably securing said base and stool portion together including:
   1. a plurality of spaced projections extending downwardly from a lower end of each of said legs of said stool portion;
   2. a generally vertically extending bore through one of said projections from each of said legs;
   3. a plurality of spaced recessed portions on said top of said base for receiving respective projections of said plurality of spaced projections from each of said legs;
   4. a generally vertically extending bore through respective recessed portions on said top of said base for communicating with the respective bores through the projections from each of said legs;
   5. a hollow boss depending from said top of said base for each of said bores through respective recessed portions thereon and communicating therewith; and
   6. fastening means mounted in each of said hollow bosses and extending through the respective bores through the recessed portions on said top of said base and into the respective bores through the respective projection from each of said legs for removably securing said base and stool portion together.

3. A step and stool comprising:
a. a hollow base having a generally flat top and a lower peripheral rim;
b. a floor engaging bumper secured to said lower peripheral rim;
c. a stool portion having a generally flat top of less area than the top of said base and provided with a plurality of equally spaced supporting legs;
d. a plurality of equally spaced hollow bosses depending from the top of said base;
e. a collapsible caster for each of said hollow bosses for rollably supporting the base and stool portion under no-load conditions and collapsible under application of pressure to the base or stool portion to allow said bumper to engage a floor surface, said casters each having a pintle received in said respective bosses, the pintle of each of said caster having an enlarged end portion slideably received in said respective bosses and defining a downwardly facing shoulder;
f. means mounted on each of said bosses and engageable with the pintle of said respective casters for permitting collapsing thereof and for retaining the pintle in said respective bosses, said retaining means comprising a clip for each of said bosses and having a generally planar base portion and a plurality of spaced arm portions extending therefrom and each having a downwardly extending projection engageable with an exterior surface of said respective bosses to thereby resist removal of the clip from the respective bosses, the planar base portion of each of said clips being engageable with the downwardly facing shoulder of the respective pintle to thereby retain the enlarged end portion thereof within said respective bosses; and
g. cooperating means on said legs of said stool portion and carried by the top of said base to removably secure said stool portion to said base whereby said stool portion and base may be separated and used separately as step stools.

4. A step and stool as set forth in claim 3 wherein:
a. said clips are each formed of a spring metal; and
b. said arm portions are each biased toward the exterior surface of said respective bosses to thereby urge said projections into engagement therewith.

5. A caster mounting for a step stool having a hollow base with side walls depending from a flat top portion, said caster mounting comprising:
a. a plurality of equally spaced downwardly opening bores extending into the top portion of the hollow base from the under side thereof and spaced from the side walls and each bore having a closed upper end;
b. a caster for each of said bores and each having a pintle with an end portion rotatably mounted in said respective bore, means on each of said pintles defining a downwardly facing shoulder, each pintle having the upper end thereof spaced from the closed upper end of the respective bore;
c. resilient means mounted in each of said bores and having respective opposite ends thereof engaging the closed upper end of said bore and the upper end of said pintle therein for normally urging said casters downwardly;
d. means on said under side of said top of the hollow base defining faces around and spaced outwardly from said bores;
e. a clip for each caster having portions engaging the respective pintle shoulder, said clip having a plurality of arm portions with projections grippingly engaging said faces to retain said end portion of the pintle in the respective bore.

6. A caster mounting for a step stool having a hollow base with side walls depending from a flat top, said caster mounting comprising:
   a. a plurality of equally spaced hollow bosses depending from the flat top of the hollow base and spaced from the side walls and each having a closed upper end;
   b. a caster for each of said hollow bosses and each having a pintle having an enlarged end portion rotatably mounted in said respective bosses and defining a downwardly facing shoulder, each pintle have the upper end thereof spaced from the closed upper end of the respective boss;
   c. resilient means mounted in each of said hollow bosses and having respective opposite ends thereof engaging the closed upper end of said hollow bosses and the upper end of said pintle therein or normally urging said casters downwardly; and
   d. a clip for each caster and having portions engageable with an exterior surface of said respective boss and with the downwardly facing shoulder of the caster pintle to thereby retain the enlarged end portion thereof within said respective boss.

7. A caster mounting as set forth in claim 6 wherein the portions of said clips engageable with the exterior surface of said respective bosses include a plurality of downwardly extending projections urged into engagement with said exterior surface of said respective bosses.

8. A caster mounting as set forth in claim 6 wherein said clips each comprise:
   a. a generally planar base portion having an aperture therethrough for said respective pintle to move, said base portion being engageable with said downwardly facing shoulder of said respective pintle;
   b. a plurality of spaced arm portions extending from said base portion; and
   c. a downwardly extending projection on each of said arm portions and engageable with an exterior surface of said respective boss to thereby resist removal of the clip from said respective boss.

9. A caster mounting as set forth in claim 8 wherein:
   a. said clips are each formed of a spring metal; and
   b. said arm portions of said clips are each biased toward the exterior surface of said respective boss to thereby urge said projections into engagement therewith.

10. A caster mounting as set forth in claim 6 wherein said clips each are formed of spring metal and comprise:
   a. a generally planar base portion having an aperture therethrough for said respective pintle to move, said base portion being engageable with said downwardly facing shoulder of said respective pintle;
   b. a plurality of spaced arm portions extending from said base portion, said arm portions each being biased toward the exterior surface of said respective boss; and
   c. a downwardly extending projection on each of said arm portions and engageable with said exterior surface of said respective boss to thereby resist removal of the clip from said respective boss.

11. A step and stool comprising:
   a. a hollow base having a generally flat top and a lower peripheral rim;
   b. a floor engaging bumper secured to said lower peripheral rim;
   c. a stool portion having a generally flat top of less area than the top of said base and provided with a plurality of equally spaced supporting legs;
   d. a plurality of equally spaced hollow bosses depending from the top of said base;
   e. a collapsible caster for each of said hollow bosses for rollably supporting the base and stool portion under no-load conditions and collapsible under application of pressure to the base or stool portion to allow said bumper to engage a floor surface, said casters each having a pintle received in said respective bosses, the pintle of each of said casters having an enlarged end portion received in said respective bosses and defining a downwardly facing shoulder; and
   f. means mounted on each of said bosses and engageable with the pintle of said respective casters for permitting collapsing thereof and for retaining the pintle in said respective bosses, said means for permitting collapsing of said casters and for retaining the pintle in said respective bosses comprising a clip having portions engageable with an exterior surface of said respective bosses and with the downwardly facing shoulder of the caster pintle to thereby retain the enlarged end portion thereof within said respective bosses, the portions of said clip engageable with the exterior surface of said respective bosses including a plurality of spaced downwardly extending projections urged into engagement with said exterior surface.

12. A caster mounting for a step stool having a hollow base with side walls depending from a flat top, said caster mounting comprising:
   a. a plurality of equally spaced hollow bosses depending from the flat top of the hollow base and spaced from the side walls and each having a closed upper end;
   b. a caster for each of said hollow bosses and each having a pintle having an enlarged end portion rotatably mounted in said respective bosses and defining a downwardly facing shoulder, each pintle having the upper end thereof spaced from the closed upper end of the respective boss;
   c. resilient means supported relative to said hollow bosses on said base and engaging said pintle for normally urging said casters downwardly; and
   d. a clip for each caster and having portions engageable with an exterior surface of said respective boss and with the downwardly facing shoulder of the caster pintle to thereby retain the enlarged end portion thereof within said respective boss.

* * * * *